Aug. 27, 1963

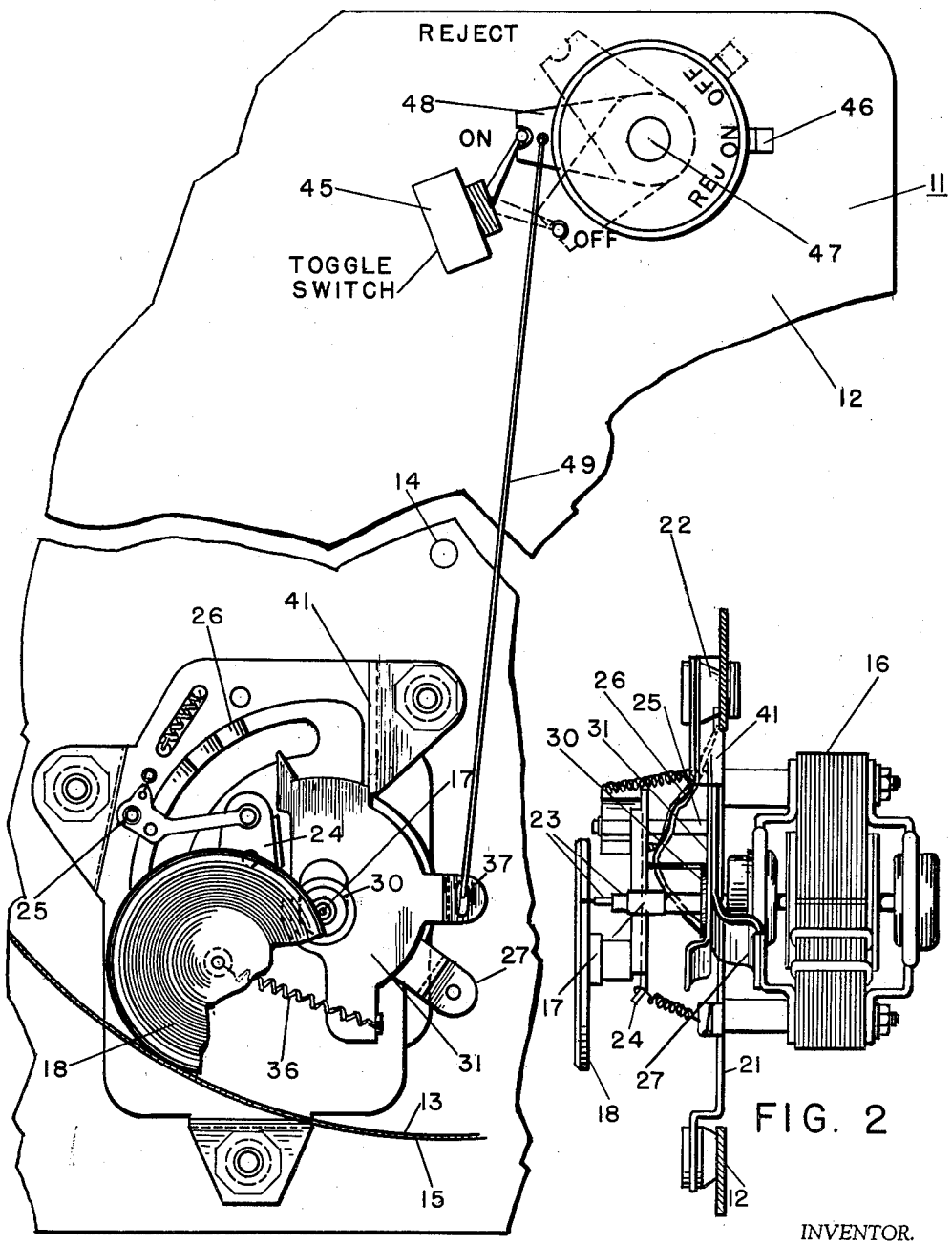

E. V. SCHNEIDER 3,101,950

FRICTION DRIVE RELEASE FOR PHONOGRAPH TURNTABLES

Filed Nov. 4, 1960

INVENTOR.
Emmor V. Schneider
BY Woodling, Krost,
Granger and Rust,
attys.

United States Patent Office 3,101,950
Patented Aug. 27, 1963

3,101,950
FRICTION DRIVE RELEASE FOR PHONOGRAPH
TURNTABLES
Emmor V. Schneider, Alliance, Ohio, assignor to The
Alliance Manufacturing Company, Division of Consolidated Electronics Industries Corporation, a corporation of Delaware
Filed Nov. 4, 1960, Ser. No. 67,316
14 Claims. (Cl. 274—9)

The invention relates in general to friction drive mechanisms and more particularly to such mechanisms having means to release the friction drive.

In friction drive mechanisms such as used in phonograph drives and the like, often a small diameter shaft is used to drive a much larger diameter idler wheel or driven wheel with a rubber tire. The idler is urged into engagement with the drive shaft and if this urging is continued when not in use, the small diameter of the drive shaft may indent the rubber tired idler to create a flat spot thereon. Accordingly, it is desirable to provide some form of mechanism to relieve the frictional drive engagement between the drive and driven wheels.

In one embodiment of the invention, the friction drive release is effected by movement of a drive engagement member which moves in a path having drive and latch portions. These portions are disposed at different angles and the mechanism has a drive engaged condition when the drive-engagement member is latched at one end of the latched portion of the path of movement. When this drive engagement member is moved, first the latch is unlatched and then it moves on the drive portion to release the drive. This may be by releasing the stress on a spring which previously had established frictional drive engagement between the idler wheel and drive shaft.

Accordingly, an object of the invention is to provide a simple drive release mechanism.

Another object of the invention is to provide a compound movement to a drive engagement member so that it may be latched in drive-engaged position and also move to be unlatched and to interrupt the friction drive.

Another object of the invention is to provide a spring stress member movable to a latched position to effect frictional drive engagement between drive and driven wheels with the mechanism self-contained insofar as establishing stress on a spring to thus maintain noise and vibration isolation of the drive mechanism.

Another object of the invention is to provide a phonograph drive mechanism with an on-and-off electric switch which controls concurrently a friction drive engaged and disengaged mechanism.

Other objects and a fuller understanding of this invention may be had by referring to the following description and claims, taken in conjunction with the accompanying drawings, in which:

FIGURE 1 is a plan view of a phonograph mechanism with the turntable cut away, incorporating the invention.

FIGURE 2 is a partial elevation view of the mechanism of FIGURE 1.

Figure 3:
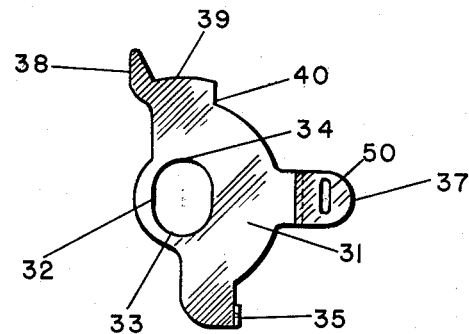
FIGURE 3 is a plan view of the drive engagement member.
Figure 4:
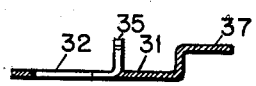
FIGURE 4 is an elevational view of the drive engagement member.

FIGURE 1 shows a general plan view of an entire phonograph mechanism 11 which illustrates one embodiment for the friction drive release of the invention. This mechanism 11 includes generally a cabinet plate 12 journalling a turntable 13 at a central pivot 14. The turntable 13 has a down-turned rim 15 which is driven from an electric motor 16, as shown in FIGURE 2, through a drive shaft 17 and an idler wheel 18. The electric motor 16 is carried on a mounting plate 21 and this mounting plate is carried by resilient noise isolation grommets 22 from the cabinet plate 12. The drive shaft 17 extends vertically and has a plurality of steps 23 for selective engagement with the idler wheel 18. This idler wheel is carried on an idler wheel mount 24 slidable on a vertical post 25 fixed on the mounting plate 21. The idler wheel mount 24 provides full floating movement, within limits, of the idler wheel 18 in a horizontal plane. A cam 26 engages the underside of the idler wheel mount 24 at the post 25 to impart vertical movements to the mount 24 and hence, to the idler wheel 18. A shift lever 27 is connected to move the cam 26, and this is one of several forms of speed changing mechanisms usable with the invention to establish different speeds of the turntable 13. For example, these may be the conventional speeds of 78, 45, 33⅓ and 16⅔ r.p.m. The mechanism is shown in FIGURE 1 with the idler wheel 18 in engagement with the smallest drive shaft step 23 which, in this example, would be to establish a speed of 16⅔ r.p.m. of the turntable.

The shift lever 27 is journalled on a hollow rivet 30 which surrounds the drive shaft 17. A drive engagement member 31 is also carried on this rivet 30 for sliding and pivotable movement. FIGURE 3 shows this drive engagement member 31 as having an elongated hole 32 with first and second ends 33 and 34 respectively. This drive engagement member 31 may also be called a spring stress member or an idler spring plate because it carries an upstanding lug 35 to which an idler spring 36 is attached, the other end of this spring being attached to the idler wheel mount 24. The drive engagement member 31 has an arm 37, a stop 38, a substantially arcuate surface 39, and a generally radial trigger surface 40. The trigger surface 40 is adapted for engagement with a latch plate 41 on the mounting plate 21.

The phonograph mechanism 11 also may include an electrical switch 45, shown as a toggle switch which may be electrically connected to control energization to the motor 16. A manual switch actuator 46 is pivoted at 47 on the cabinet plate 12 and has an arm 48 connected by a link rod 49 to an elongated hole 50 on the arm 37 on the drive engagement member 31. The arm 48, in its pivotable movement, may also be constructed to actuate the switch 45 between on and off conditions. FIGURE 1 shows the manual switch actuator 46 and the switch 45 in the on position and shows in dotted lines the off position. The manual switch actuator 46 is also shown as having a reject position with a corresponding position of the arm 48 and this may be connected to suitable mechanism to reject a record being played on the turntable 13.

FIGURE 1 shows the drive engagement member 31 so positioned that the elongated hole 32 is oriented in a direction generally parallel to the link rod 49. The trigger surface 40 is shown in engagement with the latch plate 41, and the first end 33 of the hole 32 is shown in engagement with the hollow rivet 30. In this position of FIGURE 1 the idler spring 36 is stressed to cause the idler wheel 18 to be in engagement with both the drive shaft 17 and the turntable rim 15. This urging of the spring 36 is transmitted through the idler spring plate 31, pivoted at the rivet 30 to the mounting plate 21 at the latch plate 41. This mounting plate 21 and the cabinet plate 12 may be considered to be a frame on which the other parts of the complete mechanism are carried. In this position shown in FIGURE 1, the stress of the spring 36 is self-contained within the mounting plate 21 for complete noise isolation of noise generated at the motor 16, therefore noise is not transmitted to the cabinet plate 12.

Figure 5:
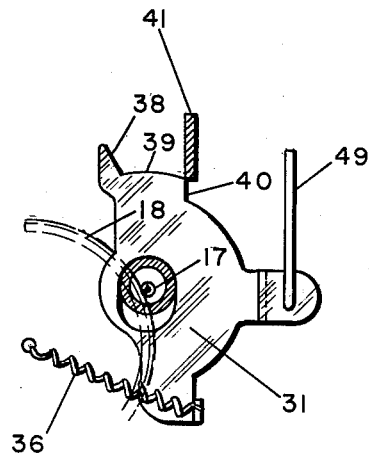
FIGURES 5 and 6 are partial views similar to the plan view of FIGURE 1 but showing the mechanism in different operative positions.
Figure 6:
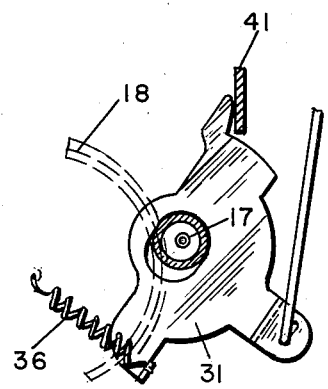

FIGURE 6 shows the mechanism 11 in the drive-released position, and FIGURE 5 shows a transition between the positions of FIGURES 1 and 6. When the phonograph is turned from on to off at the manual switch actuator 46, there is a concurrent movement of the drive engagement member 31 to change from the drive-engaged to the drive-released position. This is established in accordance with the transition from FIGURES 1 to 5 to 6. The manual actuator 46 is turned counter-clockwise from the on to the off position to turn off the switch 45 at the same time the rod 49 is pushed. This establishes two functions. The first is a bodily movement of the drive engagement member 31 with this member 31 sliding on the rivet 30. This continues until the position of FIGURE 5 is obtained whereat the trigger surface 40 has slid off the latch plate 41. This is an unlatching movement on a latch portion of the path of movement of the member 31. Second, the stress in the spring 36 plus the continued pushing on the rod 49 turns or pivots the member 31 in a clockwise direction to the position shown in FIGURE 6. This is the drive portion of the path of movement of the member 31, and at the termination of this movement, the spring 36 is collapsed and may in some cases actually push the idler wheel 18 out of engagement with the drive shaft 17. At least the tension on the spring 36 is released to disengage the friction drive from the drive shaft 17 to the idler wheel 18. With this tension released, there is no tendency for the small diameter drive shaft to indent the rubber tire on the idler wheel 18, and thus no flat spots or eccentricities will occur in the idler wheel tire despite long periods of disuse of the phonograph 11.

When the manual switch actuator 46 is turned in a clockwise direction from the off to the on position, this will pull on the link rod 49. First this causes a counter-clockwise turning of the drive engagement member 31 with the arcuate surface 39 riding on the latch plate 41. This is the change from the view of FIGURE 6 to that of FIGURE 5. When the drive engagement member 31 has been turned sufficiently to reach the position shown in FIGURE 5, then the trigger surface 40 will slideably engage the latch plate 41. The pulling on the rod 49 will then cause bodily movement of the drive engagement member 31, and this entire member 31 will move to have the rivet 30 engage the first end 33 of the hole 32. The mechanism will then return to the position shown in FIGURE 1. During the first part of this movement, the spring 36 is being stressed to urge the idler wheel into drive engagement with the drive shaft and also into engagement with the turntable rim 15. This is movement on the drive portion of the path of movement. The second portion of this path of movement is the latch portion whereat the entire drive engagement member bodily moves to latch this member 31 in the drive-engaged position. When so latched, the tension of the spring is directly transmitted to the mounting plate 21 at the latch plate 41 and therefore no tension of the spring 36 is transmitted by the link rod 49 to either the manual actuator 46 or the switch 45. This prevents any undesired movement of the manual actuator 46 or switch 45 and also provides for effective sound and vibration isolation of the motor 16.

The elongated hole 50 on the member 31 provides a lost motion connection with the link rod 49. This accommodates slight differences in mounting position of the mounting plates 21 on the cabinet plates 12 in mass production. Such lost motion connection prevents binding and affords further noise isolation.

When the manual actuator 46 is moved still further in a clockwise direction from the on to the reject position, for example, to reject a record currently being played on the turntable 13, this merely causes an increased tension on the spring 36 and the drive engagement member 31 returns to its on position shown in FIGURE 1 after this reject function. The temporarily increased stress on the idler spring 36 is not damaging especially since the record is not being played during this interval.

The drive engagement member 31 is a member which moves in a given path which path has a drive portion at one end to establish drive engagement between the drive shaft 17 and the idler wheel 18, as shown in FIGURE 1, and the path also has a latching portion at the other end of the path with the latch means effected by the trigger 40 and latch plate 41 which latches the member 31 relative to the frame to establish the drive engaged.

The drive engagement member 31 has a path of movement which is partly straight during the latching portion and partly curved during the drive portion or spring stressing portion. As a result, these two portions of the path may be considered to be generally at different angles. The drive engagement member 31 may also be considered to be an anchor member since it selectively provides an anchor for one end of the idler spring 36.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A friction drive mechanism, comprising, in combination, a frame, a rotatable drive shaft, a driven wheel adapted to be driven from said drive shaft, means carrying said drive shaft and said driven wheel on said frame, a drive engagement member acting between said drive shaft and driven wheel to effect drive therebetween, means providing a movable connection between said drive engagement member and said frame in a first path, said first path having a drive portion and a latching portion generally at different angles with an off position of the drive engagement member at one end of the drive portion and an on position at one end of the latching portion, latch means acting between said drive engagement member and said frame at said latching portion, movement of said drive engagement member from said off to said on position first causing movement on said path drive portion to establish drive engagement from said drive shaft to said idler wheel and second moving on said path latching portion to latch said latch means to hold said drive engaged, and movement of said drive engagement member from said on to said off position first moving on said path latching portion to unlatch said latch means and second moving on said path drive portion to release the drive from said drive shaft to said driven wheel.

2. A friction drive mechanism, comprising, in combination, a frame, a rotatable drive shaft, a driven wheel adapted to be driven from said drive shaft, means carrying said drive shaft and said driven wheel on said frame, a spring stress member, spring means acting between said driven wheel and said drive shaft through said spring stress member, means providing a movable connection between said spring stress member and said frame in a first path, said first path having a stressing portion and a latching portion generally at different angles with an off position of the spring stress member at one end of the stressing portion and an on position at one end of the latching portion, latch means acting between said spring stress member and said frame, movement of said spring stress member from said off to said on position first causing movement on said path stressing portion to stress said idler spring means to relatively urge into engagement said driven wheel and said drive shaft and second moving on said path latching portion to latch said latch means, and movement of said spring stress member from said on to said off position first moving on said path latching portion to unlatch said latch means and second moving on said path stressing portion to release the stress of said idler spring means to interrupt the friction drive.

3. A friction drive mechanism, comprising, in combination, a frame, a rotatable drive shaft, a driven wheel adapted for driving engagement with said drive shaft, means carrying said drive shaft and said driven wheel on said frame, a spring stress member, spring means acting between said driven wheel and said drive shaft through said spring stress member, means providing a movable connection between said spring stress member and said frame in a first path, said first path having a stressing portion and a latching portion generally at different angles with an off position of the spring stress member at one end of the stressing portion and an on position at one end of the latching portion, latch means acting between said stress member and said frame, movement of said spring stress member from said off to said on position first causing movement on said path stressing portion to stress said idler spring means to relatively urge into engagement said driven wheel and said drive shaft and second moving on said path latching portion to latch said latch means, and movement of said spring stress member from said off to said on position first causing movement on said path latching portion to unlatch said latch means and second moving on said path stressing portion to release the stress of said idler spring means to interrupt the friction drive.

4. A friction drive mechanism, comprising, in combination, a frame, a rotatable drive shaft, an idler wheel mount journalling an idler wheel adapted for driving engagement with said drive shaft, means carrying said drive shaft and said idler wheel mount on said frame, a spring stress member, idler spring means acting between said idler wheel mount and said drive shaft through said spring stress member, means providing a movable connection between said spring stress member and said frame in a first path, said first path having a stressing portion and a latching portion generally at different angles with an off position of the spring stress member at one end of the stressing portion and an on position at one end of the latching portion, latch means acting between said spring stress member and said frame, said on position establishing said latch means latched and said idler spring means stressed, movement of said spring stress member from said on to said off position first moving on said path latching portion to unlatch said latch means and second moving on said path stressing portion to release the stress of said idler spring means, and movement of said spring stress member from said off to said on position first stressing said idler spring means to relatively urge into engagement said idler wheel and said drive shaft and second latching said latch means.

5. A friction drive mechanism, comprising, in combination, a frame, a drive shaft journalled relative to said frame, an idler wheel mount journalling an idler wheel adapted for driving engagement with said drive shaft, an anchor member, means providing a movable connection between said anchor member and said frame in a first path, said first path having a stressing and a latching portion generally at different angles with an off position of the anchor member at one end of the stressing portion and an on position at one end of the latching portion, idler spring means acting between said idler wheel mount and said anchor member, a latch plate on said frame, latch means acting between said anchor member and said latch plate, said on position establishing said latch means latched and said idler spring means stressed, movement of said anchor member from said on to said off position first moving on said path latching portion to unlatch said latch means and second moving on said path stressing portion to release the stress of said idler spring means, and movement of said idler spring member from said off to said on position first stressing said idler spring means to urge said idler wheel into engagement with said drive shaft and second latching said latch means.

6. A friction drive mechanism, comprising, in combination, a frame, a drive shaft journalled relative to said frame, an idler wheel mount journalling an idler wheel adapted for driving engagement with said drive shaft, an anchor member, means providing a movable connection between said anchor member and said frame in a first path, said first path having a curved and a straight portion with an off position of the anchor member at one end of the curved portion and an on position at one end of the straight portion, idler spring means acting between said idler wheel mount and said anchor member, a latch plate on said frame, latch means acting between said anchor member and said latch plate, said on position establishing said latch means latched and said idler spring means stressed, movement of said anchor member from said on to said off position first moving on said path straight portion to unlatch said latch means and second moving on said path curved portion to release the stress of said idler spring means, and movement of said anchor member from said off to said on position first stressing said idler spring means to urge said idler wheel into engagement with said drive shaft and second latching said latch means.

7. A friction drive mechanism, comprising, in combination, a frame, a drive shaft journalled relative to said frame, an idler wheel mount journalling an idler wheel adapted for driving engagement with said drive shaft, a spring stress member, means providing a movable connection between said spring stress member and and said frame with on and off positions of said spring stress member, idler spring means acting between said idler wheel mount and said spring stress member, a latch plate on said frame, a trigger on said spring stress member, said on position establishing said trigger urged against said latch plate by said idler spring means, movement of said spring stress member from said on to said off position releasing said trigger from said latch plate and then moving said spring stress member until the stressing of said idler spring means is released, and movement of said spring stress member from said off to said on position stressing said idler spring means to urge said idler wheel into engagement with said drive shaft and moving said trigger to a position adjacent to and in engagement with said latch plate.

8. A phonograph mechanism, comprising, in combination, a frame, a drive shaft journalled relative to said frame, an idler wheel mount journalling an idler wheel adapted for driving engagement with said drive shaft, a spring stress member, means providing a movable connection between said spring stress member and said frame, idler spring means acting between said idler wheel mount and said spring stress member, a manual actuator on said frame and having on and off positions, a link between said manual actuator and said spring stress member to impart movements to said spring stress member in direct accordance with movements of said manual actuator, a latch plate on said frame, a trigger surface on said spring stress member, said on position establishing said trigger surface urged against said latch plate by said idler spring means, movement of said manual actuator from said on to said off position pushing on said link and moving said spring stress member to release said trigger from said latch plate and then moving said spring stress member until the stressing of said idler spring means is released, and movement of said manual actuator from said off to said on position pulling on said link and moving said idler spring member to stress said idler spring means to urge said idler wheel into engagement with said drive shaft and moving said trigger surface to slide adjacent said latch plate which effects movement of said idler spring member to have said trigger surface engage said latch plate.

9. A phonograph mechanism, comprising, in combination, a frame, a drive shaft journalled relative to said frame, an idler wheel mount journalling an idler wheel adapted for driving engagement with said drive shaft, an idler spring plate, means providing a sliding pivotal connection between said idler spring plate and said frame, a tension idler spring connected between said idler wheel mount and said idler spring plate, a manual actuator on said frame and having on and off positions, a link between said manual actuator and said idler spring plate to impart turning movements to said idler spring plate in direct accordance with movements of said manual actuator, a latch plate on said frame, a trigger surface on said idler spring plate, said on position establishing said trigger surface urged against said latch plate by said idler spring and with said sliding pivot at one end of movement, movement of said manual actuator from said on to said off position pushing on said link and bodily moving said idler spring plate to have said sliding pivot at the other end of movement to release said trigger surface from said latch plate and then turning said idler spring plate until said idler spring tension is released, and movement of said manual actuator from said off to said on position pulling on said link and turning said idler spring plate until said trigger surface slides adjacent said latch plate which effects bodily movement of said idler spring plate with said sliding pivot at said one end of movement to have said trigger surface engage said latch plate and to tension said idler spring to urge said idler wheel into engagement with said drive shaft.

10. A phonograph mechanism, comprising, in combination, a frame, an electric motor carried on said frame, a drive shaft on said motor, an idler wheel mount journalling an idler wheel adapted for driving engagement with said drive shaft, an idler spring plate, means providing a sliding and pivotal connection between said idler spring plate and said frame, a tension idler spring connected between said idler wheel mount and said idler spring plate, an electric switch having on and off positions and mounted on said frame, means electrically connecting said switch and said motor to control energization to said motor, a switch actuator for said switch, a link between said switch actuator and said idler spring plate to impart turning movements to said idler spring plate in direct accordance with movements of said switch actuator, a latch plate on said frame, a generally radial trigger surface on said idler spring plate, a stop on said idler spring plate, said on position establishing said trigger surface urged against said latch plate by said idler spring and with said sliding pivot at one end of movement, movement of said switch actuator from said on to said off position pushing on said link and bodily moving said idler spring plate to have said sliding pivot at the other end of movement to release said trigger surface from said latch plate and then turning said idler spring plate until said stop approaches said latch plate whereat said idler spring tension is released, and movement of said switch actuator from said off to said on position pulling on said link and turning said idler spring plate until said trigger surface slides adjacent said latch plate which effects bodily movement of said idler spring plate with said sliding pivot at said one end of movement to have said trigger surface engage said latch plate and to tension said idler spring to urge said idler wheel into engagement with said drive shaft.

11. A phonograph mechanism, comprising, in combination, a frame, a turntable with a rim journalled relative to said frame, a drive shaft journalled relative to said frame, an idler wheel mount journalling an idler wheel adapted for simultaneous engagement with said drive shaft and said turntable rim to drive said turntable, a pivot fastened on said frame, an idler spring plate having an elongated hole with first and second ends and journalled thereat on said pivot, a tension idler spring connected between said idler wheel mount and said idler spring plate, a manual actuator mounted on said frame and having on and off positions, a link between said manual actuator and said idler spring plate to impart turning movements to said idler spring plate in direct accordance with movements of said manual actuator, a latch plate on said frame, a generally radial trigger surface on said idler spring plate, a stop on said idler spring plate, a substantially arcuate surface on said idler spring plate joining said trigger surface and said stop, said on position establishing said trigger surface urged against said latch plate by said idler spring and with said pivot against said elongated hole first end, movement of said manual actuator from said on to said off position pushing on said link and bodily moving said idler spring plate to have said elongated hole second end engage said pivot to release said trigger surface from said latch plate and then turning said idler spring plate until said stop engages said latch plate whereat said idler spring tension is released, and movement of said manual actuator from said off to said on position pulling on said link and turning said idler spring plate until said arcuate surface slides off said latch plate at said trigger surface which effects bodily movement of said idler spring plate for engagement of said elongated hole first end and said pivot to have said trigger surface engage said latch plate and to tension said idler spring to urge said idler wheel into engagement with said drive shaft.

12. A phonograph mechanism, comprising, in combination, a frame, a turntable with a rim journalled relative to said frame, an electric motor carried on said frame, a drive shaft on said motor, an idler wheel mount journalling an idler wheel adapted for simultaneous engagement with said drive shaft and said turntable rim to drive said turntable from said motor, a pivot on said frame, an idler spring plate having a hole elongated in a first direction with first and second ends and journalled thereat on said pivot, a tension idler spring connected between said idler wheel mount and said idler spring plate, an electric switch having on and off positions and mounted on said frame, means electrically connecting said switch and said motor to control energization to said motor, a switch actuator for said switch, a link between said switch actuator and said idler spring plate to impart turning movements to said idler spring plate in direct accordance with movements of said switch actuator, a latch plate on said frame, a generally radial trigger surface on said idler spring plate, a stop on said idler spring plate, said on position establishing said trigger surface urged against said latch plate by said idler spring and with said pivot against said elongated hole first end, movement of said switch actuator from said on to said off position pushing on said link and bodily moving said idler spring plate to have said elongated hole second end engage said pivot to release said trigger surface from said latch plate and then turning said idler spring plate until said stop engages said latch plate whereat said idler spring tension is released, and movement of said switch actuator from said off to said on position pulling on said link and turning said idler spring plate until said trigger surface slides adjacent said latch plate which effects bodily movement of said idler spring plate for engagement of said elongated hole first end and said pivot to have said trigger surface engage said latch plate and to tension said idler spring to urge said idler wheel into engagement with said drive shaft.

13. A phonograph mechanism, comprising, in combination, a frame, a turntable with a rim journalled relative to said frame, an electric motor carried on said frame, a drive shaft on said motor, an idler wheel mount journalling an idler wheel adapted for simultaneous engagement with said drive shaft and said turntable rim to drive said turntable from said motor, a hollow rivet fastened on said frame coaxial with said drive shaft, an idler spring plate having a hole elongated in a first direction with first and second ends and journalled thereat on said hollow rivet, a tension idler spring connected between said idler wheel mount and said idler spring plate, an electric switch having on and off positions and mounted on said frame, means electrically connecting said switch and said motor to control energization to said motor, a switch actuator for said switch, a rod linking said switch actuator and said idler spring plate to impart turning movements to said idler spring plate in direct accordance with movements of said switch actuator, a latch plate on said frame, a generally radial trigger surface on said idler spring plate, a stop on said idler spring plate, a substantially arcuate surface on said idler spring plate joining said trigger surface and said stop, said on position establishing the elongation of said hole in said idler spring plate generally in the same direction as said rod and with said trigger surface urged against said latch plate by said idler spring and with said hollow rivet against said elongated hole first end, movement of said switch actuator from said on to said off position pushing on said rod and bodily moving said idler spring plate to have said elongated hole second end engage said hollow rivet to effect release of said trigger surface from said latch plate and then turning said idler spring plate until said stop engages said latch plate whereat said idler spring tension is released, and movement of said switch actuator from said off to said on position pulling on said rod and turning said idler spring plate until said arcuate surface slides off said latch plate at said trigger surface which effects bodily movement of said idler spring plate for engagement of said elongated hole first end and said hollow rivet to have said trigger surface engage said latch plate and to tension said idler spring to urge said idler wheel into engagement with said drive shaft.

14. A phonograph mechanism, comprising, in combination, a cabinet plate, a turntable with a downturned rim journalled on said cabinet plate, a mounting plate, resilient noise isolation means supporting said mounting plate relative to said cabinet plate, an electric motor carried on said mounting plate, a vertical drive shaft on said motor, an idler wheel mount journalling an idler wheel adapted for simultaneous engagement with said drive shaft and said turntable rim to drive said turntable from said motor, a hollow rivet fastened on said mounting plate coaxial with said drive shaft, a speed change mechanism including a shifter plate journalled on said hollow rivet, a plurality of steps of different diameters on said drive shaft, cam and follower means acting between said shifter plate and said idler wheel mount to selectively change the elevation of said idler wheel to select the cooperation thereof with different ones of said drive shaft steps to rotate said turntable at different speeds, an idler spring plate having a hole elongated in a first direction with first and second ends and journalled thereat on said hollow rivet, a tension idler spring connected between said idler wheel mount and said idler spring plate, an electric switch having on and off conditions and mounted on said cabinet plate, means electrically connecting said switch and said motor to control energization to said motor, a switch actuator having on, off and reject positions and connected to actuate said switch to said on and off conditions in the on and off positions, respectively, of said switch actuator, said on position being between said off and said reject positions, a rod linking said switch actuator and said idler spring plate to impart turning movements to said idler spring plate in direct accordance with movements of said switch actuator to said off, on and reject positions, a latch plate on said mounting plate, a generally radial trigger surface on said idler spring plate, a stop on said idler spring plate, a substantially arcuate surface on said idler spring plate adjoining said trigger surface and said stop, said on position establishing the elongation of said hole in said idler spring plate generally in the same direction as said rod and with said trigger surface urged against said latch plate by said idler spring, and with said hollow rivet against said first end of said elongated hole, movement of said switch actuator from said on to said off position pushing on said rod and bodily moving said idler spring plate to have the second end of said elongated hole engage said hollow rivet to effect release of said trigger surface from said latch plate and then turning said idler spring plate until said stop engages said latch plate whereat said idler spring tension is released, movement of said switch actuator from said off to said on position pulling on said rod and turning said idler spring plate until said arcuate surface slides off said latch plate at said trigger surface which effects bodily movement of said idler spring plate for engagement of said elongated hole first end and said hollow rivet to have said trigger surface engage said latch plate and to tension said idler spring to urge said idler wheel into engagement with said drive shaft, and movement of said switch actuator from said on to said reject position turning said idler spring plate to increase the tension in said idler spring.

References Cited in the file of this patent

UNITED STATES PATENTS 2,977,124     Staar                 Mar. 28, 1961